United States Patent
Aoki

(10) Patent No.: US 10,326,666 B2
(45) Date of Patent: Jun. 18, 2019

(54) COMMUNICATION APPARATUS, CONTROL METHOD, AND COMPUTER READABLE STORAGE MEDIUM

(71) Applicant: CANON KABUSHIKI KAISHA, Tokyo (JP)

(72) Inventor: Hitoshi Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 15/647,559

(22) Filed: Jul. 12, 2017

(65) Prior Publication Data
US 2018/0034707 A1 Feb. 1, 2018

(30) Foreign Application Priority Data
Jul. 29, 2016 (JP) .................................. 2016-150553

(51) Int. Cl.
*H04L 12/24* (2006.01)
*H04W 4/80* (2018.01)
(Continued)

(52) U.S. Cl.
CPC ....... *H04L 41/145* (2013.01); *H04N 21/4126* (2013.01); *H04W 4/80* (2018.02); *H04W 8/005* (2013.01); *H04W 16/14* (2013.01); *H04W 16/20* (2013.01); *H04W 24/02* (2013.01); *H04W 40/02* (2013.01); *H04W 40/248* (2013.01);
(Continued)

(58) Field of Classification Search
CPC ...... H04L 41/145; H04W 4/80; H04W 8/005; H04W 16/14; H04W 16/20; H04W 24/02; H04W 40/02; H04W 40/248; H04W 48/20
See application file for complete search history.

(56) References Cited

U.S. PATENT DOCUMENTS

| 9,565,684 B2 | 2/2017 | Barkay et al. |
| 2013/0142170 A1 | 6/2013 | Sakai |

(Continued)

FOREIGN PATENT DOCUMENTS

| EP | 2999294 A1 | 3/2016 |
| JP | 2011259033 A | 12/2011 |

(Continued)

OTHER PUBLICATIONS

EESR issued in European Appln. No. 17183566.3 dated Nov. 7, 2017.
(Continued)

*Primary Examiner* — Ronald B Abelson
(74) *Attorney, Agent, or Firm* — Rossi, Kimms & McDowell LLP

(57) ABSTRACT

A communication apparatus, that can concurrently execute a first mode of joining a wireless network formed by another apparatus and a second mode of forming a wireless network, can determine whether a first wireless channel used in the first mode executed by the communication apparatus is a specific channel requiring a device to have a predetermined function to avoid radio-wave interference when the device operates as an apparatus that forms a wireless network using the wireless channel and controls, when executing the first mode and the second mode concurrently, an operation of the second mode in accordance with a result of the determination.

8 Claims, 9 Drawing Sheets

(51) Int. Cl.

| | | |
|---|---|---|
| *H04W 8/00* | (2009.01) | |
| *H04W 16/14* | (2009.01) | |
| *H04W 16/20* | (2009.01) | |
| *H04W 24/02* | (2009.01) | |
| *H04W 40/02* | (2009.01) | |
| *H04W 40/24* | (2009.01) | |
| *H04W 48/20* | (2009.01) | |
| *H04N 21/41* | (2011.01) | |
| *H04W 84/12* | (2009.01) | |
| *H04W 84/18* | (2009.01) | |
| *H04W 84/22* | (2009.01) | |
| *H04W 88/06* | (2009.01) | |
| *H04W 88/08* | (2009.01) | |
| *H04W 92/02* | (2009.01) | |

(52) U.S. Cl.
CPC ............ *H04W 48/20* (2013.01); *H04W 84/12* (2013.01); *H04W 84/18* (2013.01); *H04W 84/22* (2013.01); *H04W 88/06* (2013.01); *H04W 88/08* (2013.01); *H04W 92/02* (2013.01); *Y02D 70/00* (2018.01); *Y02D 70/142* (2018.01); *Y02D 70/30* (2018.01)

(56) References Cited

U.S. PATENT DOCUMENTS

| | | |
|---|---|---|
| 2014/0349669 A1 | 11/2014 | Qi et al. |
| 2016/0014824 A1 | 1/2016 | Xiang et al. |
| 2016/0037504 A1 | 2/2016 | Tamura |
| 2016/0057721 A1* | 2/2016 | Chandrashekar ..... H04W 56/00 |

FOREIGN PATENT DOCUMENTS

| | | |
|---|---|---|
| JP | 2013172275 A | 9/2013 |
| WO | 2013162492 A1 | 10/2013 |

OTHER PUBLICATIONS

Elliott Laboratories "Dynamic Frequency Selection Requirements." Jan. 31, 2007: 1-74. Cited in NPL 1.

* cited by examiner

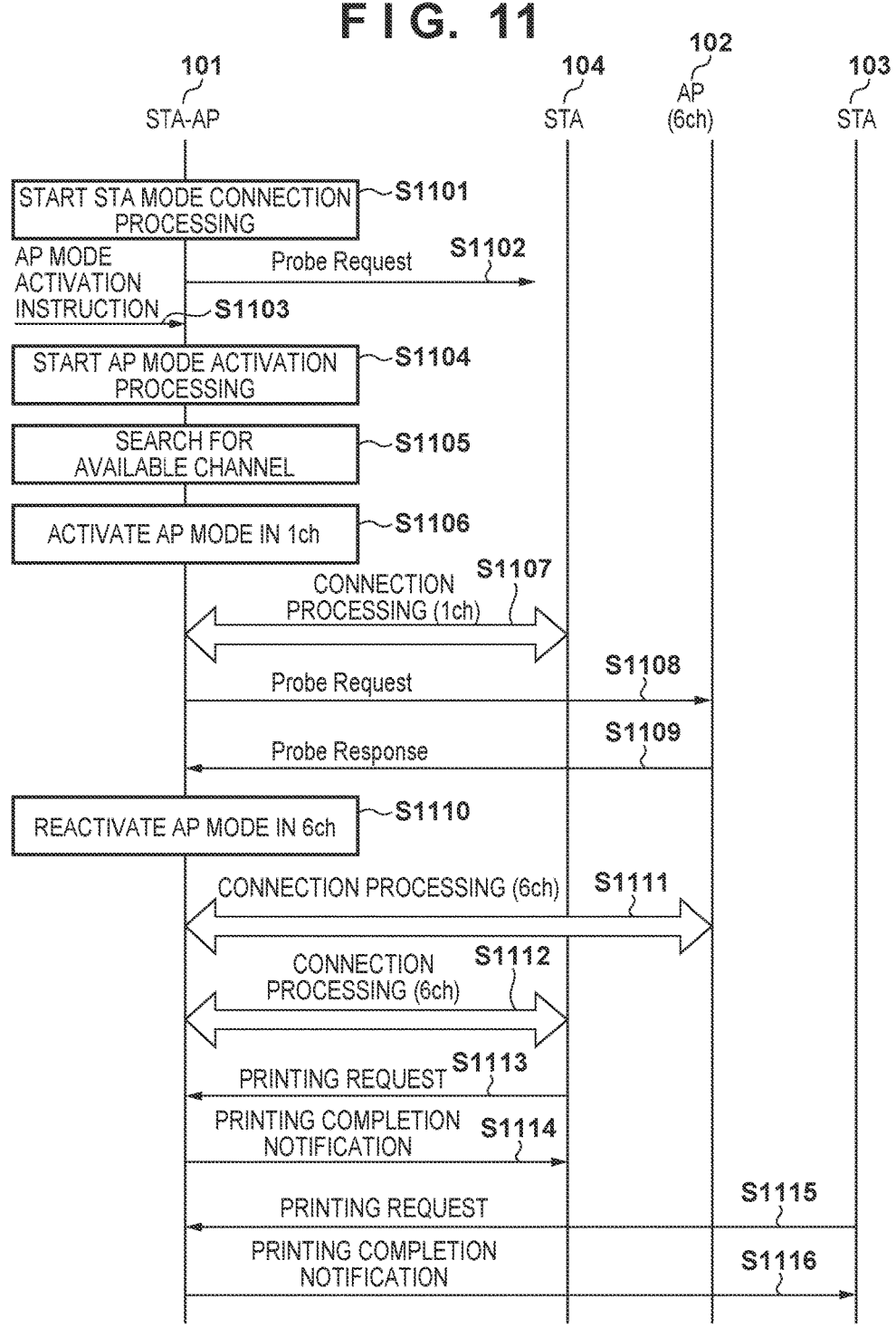

COMMUNICATION APPARATUS, CONTROL METHOD, AND COMPUTER READABLE STORAGE MEDIUM

BACKGROUND OF THE INVENTION

Field of the Invention

The present invention relates to a communication control technique in wireless communication.

Description of the Related Art

A wireless LAN system represented by the IEEE802.11 standard series has become used in many devices. In a wireless LAN, a network is controlled by an access point (to be referred to as an "AP" hereinafter) that operates as a base station that can communicate with one or more wireless terminals. A network by wireless LAN is formed by an AP and a station (to be referred as an "STA" hereinafter) that is a wireless terminal which falls within the coverage of radio waves emitted by the AP and has established wireless connection with the AP. In recent years, products and specification standards for implementing networks by various forms of wireless LAN have appeared on the market, in addition to this conventional simple wireless network configuration of the AP and the STA.

There exists a communication apparatus that can concurrently execute, in order to join a plurality of wireless networks, an AP function (to be called an "AP mode" hereinafter) of performing communication as the base station and an STA function (to be referred to as an "STA mode" hereinafter) of performing communication by connecting to another apparatus which operates as the base station. Such a communication apparatus can operate as an AP to form a separate network while being connected to another AP by operating as an STA (refer to Japanese Patent Laid-Open Nos. 2011-259033 and 2013-172275).

In a case in which a communication apparatus is to execute the STA mode and the AP mode concurrently, there may be constraints on wireless channels that can be used for communication by the communication apparatus. Hence, user convenience may be lost due to such constraints.

SUMMARY OF THE INVENTION

The present invention prevents the loss of user convenience due to restrictions on usable communication channels in a communication apparatus that can execute a plurality of communication modes.

According to one aspect of the present invention, there is provided a communication apparatus that can concurrently execute a first mode of joining a wireless network formed by another apparatus and a second mode of forming a wireless network, comprising: a determination unit configured to determine whether a first wireless channel used in the first mode executed by the communication apparatus is a specific channel requiring a device to have a predetermined function to avoid radio-wave interference when the device operates as an apparatus that forms a wireless network using the wireless channel; and a control unit configured to control, when executing the first mode and the second mode concurrently, an operation of the second mode in accordance with a result of determination by the determination unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a sequence chart showing another example of the processing procedure in the wireless communication system.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

After a description of the configuration of a wireless communication system and the arrangement of a communication apparatus (an STA-AP 101 (to be described later)) included in the wireless communication system, which are common to the respective embodiments, a processing procedure according to each embodiment will be described.

(Configuration of Wireless Communication System)

Figure 1:
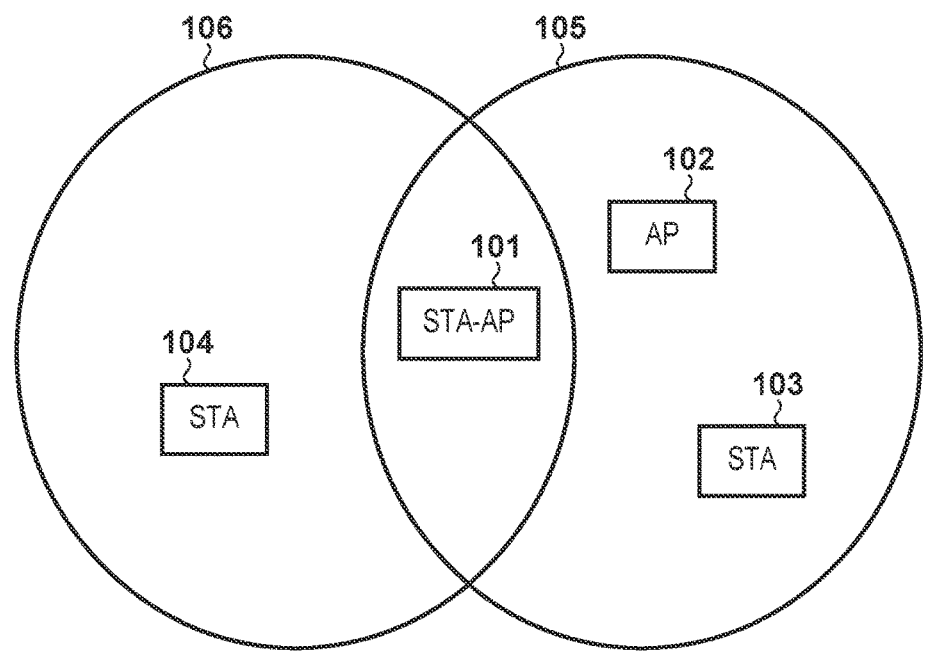
FIG. 1 is a view showing an example of the configuration of a wireless communication system.

FIG. 1 shows an example of the configuration of a wireless communication system according to each embodiment. This wireless communication system is a communication system by a wireless LAN complying with the IEEE802.11 standard series and is formed by including a plurality of communication apparatuses (the STA-AP 101, an AP 102, an STA 103, and an STA 104).

The STA-AP 101 is a communication apparatus that has both functions of an STA (Station) mode and an AP (Access Point) mode complying with the IEEE802.11 standard and can execute the STA mode and the AP mode concurrently. On the other hand, the AP 102 is a communication apparatus that functions as an access point complying with the IEEE802.11 standard, and the STA 103 and the STA 104 are communication apparatuses that function as stations complying with the IEEE802.11 standard.

The STA-AP 101 can join, in the STA mode, a first wireless network formed by a communication apparatus having another AP function. In addition, the STA-AP 101 can form, in the AP mode, a second wireless network different from the first wireless network to which the STA-AP 101 has joined in the STA mode. FIG. 1 shows how the STA-AP 101 can form a wireless network 106 in the AP mode while joining a wireless network 105 formed by the AP 102 in the STA mode. Note that FIG. 1 further shows a state in which the STA 103 can join the wireless network 105 formed by the AP 102 and the STA 104 can join the wireless network 106 formed by the STA-AP 101 in the AP mode.

In a communication apparatus such as the STA-AP 101 that can execute the STA mode and the AP mode concurrently, there may be constraints on the wireless channels usable for communication by the communication apparatus as described above. For example, due to hardware constraints, a communication apparatus that can communicate by only one wireless channel is required to use the same wireless channel for the STA mode and the AP mode. That is, when such a communication apparatus joins the wireless network on channel 1 (2412 MHz) of the 2.4-GHz band in the STA mode, the communication apparatus also is required to form a wireless network on channel 1 of the 2.4-GHz band in the AP mode.

Note that there is a communication apparatus that can join, by including a plurality of RF control modules and a plurality of antennas, the wireless networks on wireless channels which are different from each other. However, including a plurality of RF control modules and antennas in the communication apparatus can increase the cost by complicating the arrangement of the circuits and the antennas or can increase the size of the apparatus. Hence, it is not necessarily practical for all communication apparatuses which are capable of executing the AP mode and the STA mode concurrently to include such a plurality of RF control modules and antennas.

Therefore, assume that the STA-AP 101 according to this embodiment includes one RF control circuit and can operate in only one wireless channel at a time. Hence, in a case in which the STA-AP 101 is to execute the STA mode and the AP mode concurrently, the wireless network 105 and the wireless network 106 need to be formed using the same wireless channel.

Note that various kinds of use constraints can exist depending on the wireless channel. For example, although many of the communication apparatuses having a wireless LAN function can communicate in the 2.4-GHz band, even such a communication apparatus may not support communication in the 5-GHz band. Hence, if the wireless network is formed in the 5-GHz band, communication may not be possible with some of the communication apparatuses in this wireless network.

Also, some countries and regions impose restrictions on wireless channels called W53 (channels 52-60: 5260 MHz-5320 MHz) and W56 (channels 100-140: 5500 MHz-5700 MHz) of the 5-GHz band to prevent interference with other systems. For example, it is compulsory for a communication apparatus to include a mechanism such as DFS (Dynamic Frequency Selection) or TPC (Transmit Power Control) in order to use these wireless channels. Particularly, since an AP that forms a W53/W56 wireless network requires hardware for detecting radar, the manufacturing/operation cost can increase and control can become complicated. Also, such an AP requires radar detection to be performed for a predetermined period to form a wireless network, and wireless communication is not possible during this period. As a result, user convenience is degraded. Furthermore, when radar is detected, such an AP is required to switch the used channel to another wireless channel, and this may require radar detection again.

The STA-AP 101 according to this embodiment performs communication control premised on the existence of such restrictions. More specifically, in a case in which a wireless channel used to connect to a neighboring AP by the STA mode is, for example, a wireless channel in the 5-GHz band or a wireless channel included in W53/W56, the STA-AP 101 stops or does not activate the AP mode. Additionally, in a case in which the wireless channel used to connect to a neighboring AP in the STA mode is the predetermined wireless channel described above, the STA-AP 101 activates the AP mode in, for example, the 2.4-GHz band and activates the AP mode and STA mode by switching between the respective modes by time division. As a result of these control operations, when the STA mode and the AP mode are executed concurrently by activating the AP mode in the wireless channel used by the STA mode, it can prevent the occurrence of problems such as another apparatus not being able to connect to the wireless network formed in the AP mode and the like. Note that in a case in which the wireless channel used to connect to the neighboring AP in the STA mode is not the predetermined wireless channel described above, the STA-AP 101 activates/reactivates the AP mode by using the same wireless channel as that used in the STA mode. As a result, the STA-AP 101 can execute the STA mode and the AP mode concurrently in the wireless channel without any occurrence of problems such as another apparatus not being able to connect to the wireless network formed in the AP mode.

(Arrangement of STA-AP 101)

Figure 2:
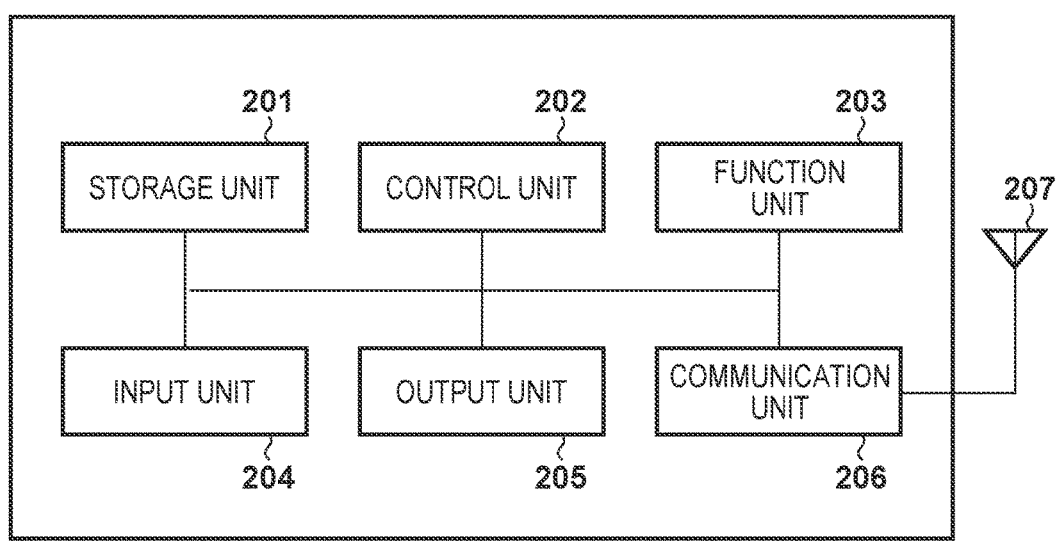
FIG. 2 is a block diagram showing an example of the hardware arrangement of an STA-AP 101.

FIG. 2 shows an example of the hardware arrangement of the STA-AP 101. The STA-AP 101 includes as its hardware arrangement, for example, a storage unit 201, a control unit 202, a function unit 203, an input unit 204, an output unit 205, a communication unit 206, and an antenna 207.

The storage unit 201 is formed from, for example, both a ROM and a RAM or one of them, and stores programs for performing the various kinds of operations (to be described later) and various pieces of information such as communication parameters for wireless communication and the like. Here, ROM is the acronym of Read Only Memory, and RAM is the acronym of Random Access Memory. Note that other than a memory such as the ROM or the RAM, a storage medium such as a flexible disk, a hard disk, an optical disk, a magneto-optical disk, a CD-ROM, a CD-R, a magnetic tape, a nonvolatile memory card, or a DVD can be used as the storage unit 201.

The control unit 202 is formed from at least one CPU or an MPU and controls the overall STA-AP 101 by executing the programs stored in the storage unit 201. Here, CPU is the acronym of Central Processing Unit, and MPU is the acronym of Micro Processing Unit. Note that the control unit 202 can control the overall STA-AP 101 through cooperation with an OS and the programs stored in the storage unit 201. Here, OS is the acronym of Operating System. In addition, the control unit 202 controls the function unit 203 to execute predetermined processes such as image capturing processing, print processing, and projection processing.

The function unit 203 is hardware for the STA-AP 101 to execute predetermined processing. For example, if the STA-AP 101 is a camera, the function unit 203 serves as an image capturing unit and performs image capturing processing. Also, for example, if the STA-AP 101 is a printer, the function unit 203 serves as a printing unit and performs print processing. Furthermore, for example, if the STA-AP 101 is a projector, the function unit 203 serves as a projection unit and performs projection processing. The data to be processed by the function unit 203 can be data stored in the storage unit 201 or data obtained by communicating with another communication apparatus via the communication unit 206 (to be described later). Note that in this embodiment, the STA-AP 101 is a printer and executes print processing as the predetermined processing. However, the present invention is not limited to this. The STA-AP 101 can be an apparatus having an arbitrary function such as a copy machine, a scanner, a digital camera, a PC, or a mobile apparatus such as a smartphone.

The input unit 204 accepts various kinds of operations from a user. The output unit 205 makes various kinds of outputs to the user. Here, an output by the output unit 205 includes at least one of a display on a screen, an audio output by a loudspeaker, a vibration output, and the like. Note that the input unit 204 and the output unit 205 can be implemented together in a single module by a touch panel or the like.

The communication unit 206 performs IP communication control and wireless communication control complying with the IEEE802.11 standard series. IP is the acronym of Internet Protocol. In addition, the communication unit 206 controls the antenna 207 to transmit/receive wireless signals for wireless communication. The STA-AP 101 communicates a content such as image data, document data, video data, or the like with another communication apparatus via the communication unit 206. Note that the communication unit 206 of the STA-AP 101 according to this embodiment includes at least one RF control module (a so-called wireless chip) and one antenna and can perform communication by only one wireless channel at a time.

Figure 3:
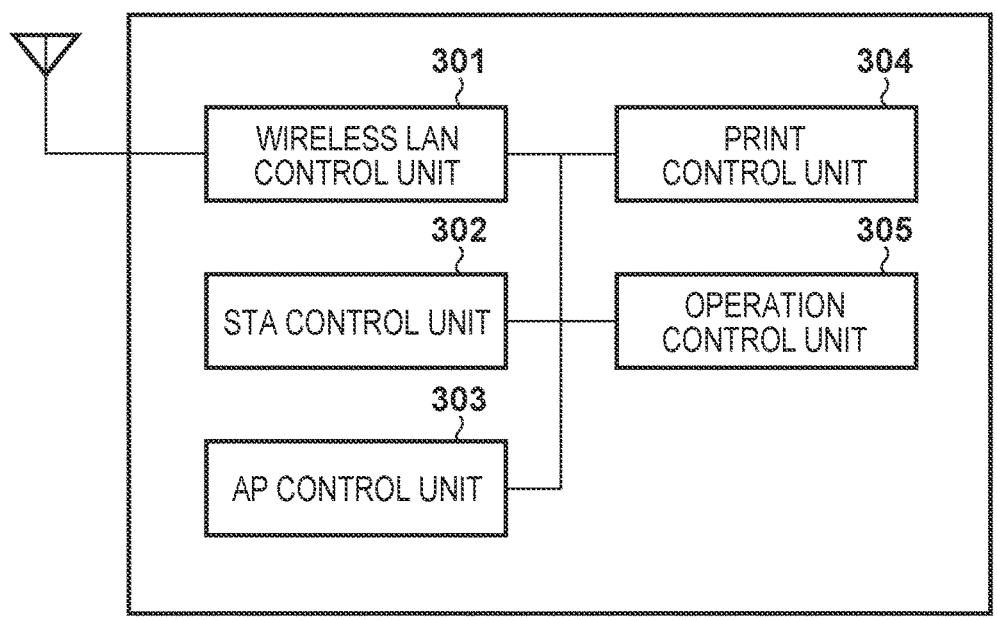
FIG. 3 is a block diagram showing the functional configuration of the STA-AP 101.

FIG. 3 shows an example of the functional configuration of the STA-AP 101. The STA-AP 101 includes as the functional configuration, for example, a wireless LAN control unit 301, an STA control unit 302, an AP control unit 303, a print control unit 304, and an operation control unit 305.

The wireless LAN control unit 301 performs, with a communication apparatus capable of communicating by another wireless LAN, control for transmitting/receiving wireless signals in accordance with a signal format of the corresponding wireless LAN. The wireless LAN control unit 301 also executes various kinds of control related to the wireless LAN complying with the IEEE802.11 standard series. The STA control unit 302 is a control unit for performing control in the STA mode and performs control to connect to a communication apparatus functioning as an AP different from the self-apparatus. The AP control unit 303 is a control unit for performing control in the AP mode and performs control to form a wireless network by causing the self-apparatus to function as an AP.

The print control unit 304 receives a print job from another communication apparatus via the wireless LAN control unit 301 and executes printing in accordance with the received print job. Note that although the STA-AP 101 has been described to be a printer in this embodiment, the present invention is not limited to this. The STA-AP 101 can include various kinds of function units in accordance with the type of the apparatus. For example, if the STA-AP 101 is to be a camera, it may include an image capturing control unit, and if the STA-AP 101 is to be a scanner, it may include a reading control unit. The operation control unit 305 accepts and manages the operation from the user of the STA-AP 101 and transmits appropriate signals at suitable times to each of the wireless LAN control unit 301, the STA control unit 302, the AP control unit 303, and the print control unit 304 in accordance with the operation.

Note that, in one example, the functions of these respective control units 301 to 305 are implemented by the control unit 202 executing the programs stored in the storage unit 201. At this time, the control unit 202 implements the respective functions by performing, in accordance with the control programs, control of each piece of hardware in addition to calculating and processing information. Note that some or all of the functions included in the functional configuration of FIG. 3 may be implemented as hardware. In this case, some or all of the functions included in the control units 301 to 305 can be formed by, for example, an ASIC (Application Specific Integrated Circuit).

(Processing Procedure)

Some embodiments of the processing to be executed by the above-described STA-AP 101 will be described next.

First Embodiment

Figure 4:
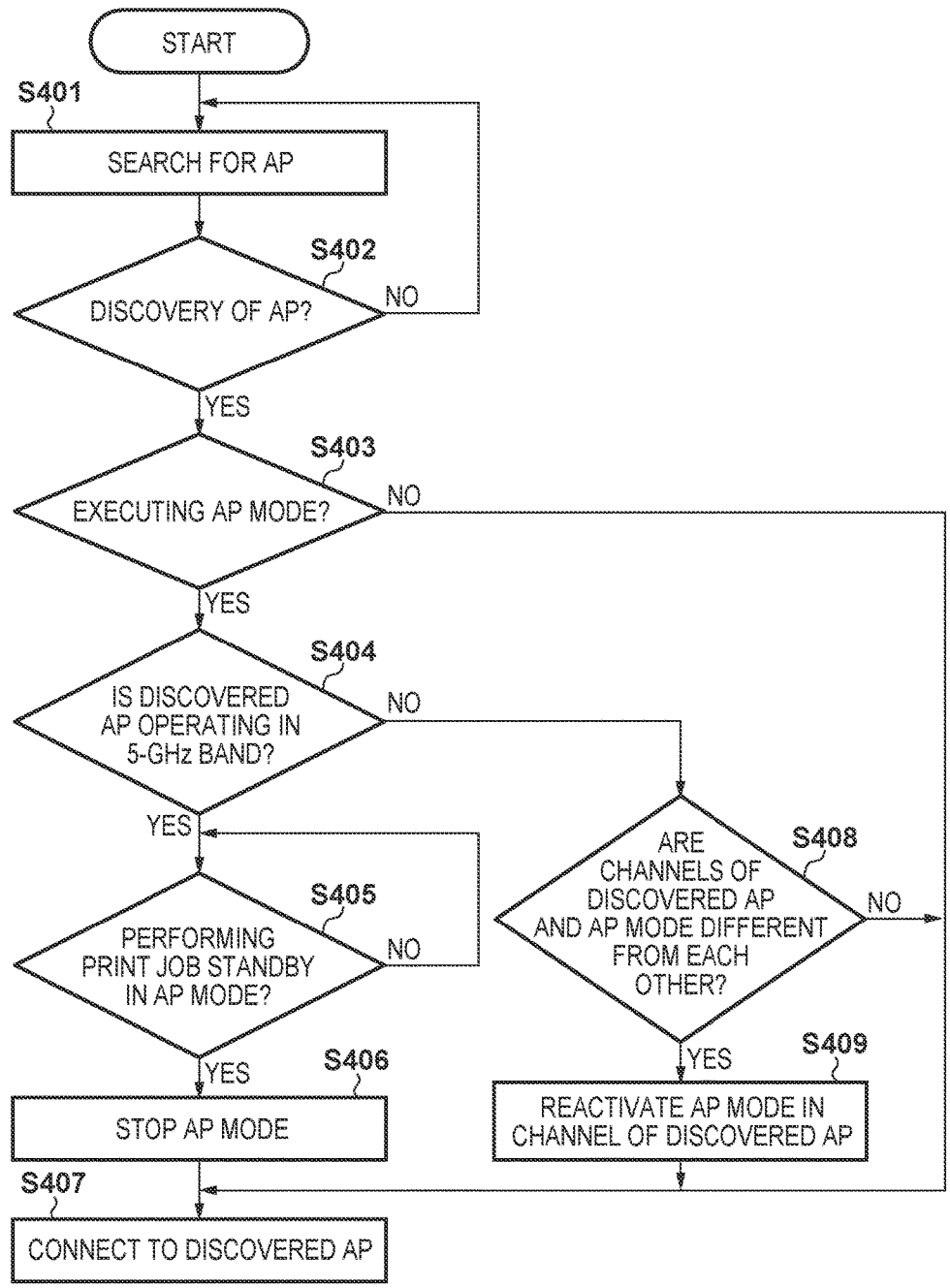
FIG. 4 is a flowchart showing an example of the procedure of STA mode connection processing.

FIG. 4 shows an example of the procedure of processing when the STA-AP 101 joins the wireless network 105 in the STA mode. This processing is executed when the user of the STA-AP 101 completes the settings to cause the STA-AP 101 to join a network by wireless LAN. The settings for the STA-AP 101 to join the network by wireless LAN include settings such as an SSID for identifying the network, a security method, and a pass phrase. Also, if the user has executed the settings once, this processing is executed when the STA-AP 101 has not joined the network in the STA mode or when the power supply is turned on. Here, assume that the STA 104 can communicate in only the 2.4-GHz band and does not support the 5-GHz band. Therefore, when the STA-AP 101 of this embodiment is to use the 5-GHz band in the STA mode, it stops or does not activate the AP mode, and when the STA-AP 101 is to use the 2.4-GHz band in the STA mode, it activates the AP mode using the same wireless channel as that used in the STA mode.

Note that the flowchart shown in FIG. 4 can be implemented by the control unit 202 of the STA-AP 101 executing control programs stored in the storage unit 201 and executing calculation and processing of information in addition to controlling each piece of hardware.

First, the STA-AP 101 searches for the AP (step S401) in accordance with the settings input by the user via the input unit 204. The STA-AP 101 searches, for example, for an AP matching the SSID and the security method designated by the user by transmitting a probe request defined by the IEEE802.11 standard series. The STA-AP 101 continues to search for the AP while the AP cannot be discovered (NO in step S402). When the AP is discovered (YES in step S402), the process advances to step S403. Note that although a case in which a search for an AP is performed after the user has preset the wireless setting has been described here, the present invention is not limited to this. For example, after searching for a neighboring AP, the STA-AP 101 can notify the user of each connection candidate AP via the output unit 205 and then perform control to accept a desired connection destination AP selected from the candidates by the user.

In step S403, the STA-AP 101 determines whether it is executing the AP mode. That is, the STA-AP 101 determines whether the wireless network 106 is formed by the AP control unit 303. When it is determined that the AP mode is being executed (YES in step S403), the STA-AP 101 determines whether the AP which was discovered in step S401 is operating in the 5-GHz band, that is, whether a wireless network has been formed in the 5-GHz frequency band (step S404). When it is determined that the discovered AP is operating in the 5-GHz band (YES in step S404), the STA-AP 101 subsequently determines whether the self-apparatus is standing by for a print job in the currently executed AP mode (step S405). In other words, the STA-AP 101 determines whether it has received a print job from another communication apparatus, which has joined the wireless network 106 formed in the AP mode, and is currently in a printing state. That is, the STA-AP 101 determines that it is not in a print job standby state (NO in step S405) when it is printing. On the other hand, the STA-AP 101 determines that it is in a print job standby state (YES in step S405) when it is not printing. Note that, in a state in which the storage unit 201 is storing, although not printing, a print job which has been received from another apparatus, that is, a state in which a print standby job is held, the STA-AP 101 can determine that it is not in a print job standby state (NO in step S405). For example, the STA-AP 101 can determine that the self-apparatus is not in a print job standby state (NO in step S405) even in a state in which printing has been stopped due to an occurrence of an error such as running out of ink or sheets during printing. When the STA-AP 101 determines that the self-apparatus is printing and is not in a print job standby state (NO in step S405), it stands by until the self-apparatus changes to the print job standby state. When the STA-AP 101 determines that the self-apparatus is in a print job standby state in the AP mode (YES in step S405), it stops the AP mode (step S406). That is, the STA-AP 101 maintains communication in the AP mode without stopping the AP mode until the self-apparatus changes to a state in which the print processing is not executed at that point and then stops the AP mode after the self-apparatus has changed to a state in which the print processing is not executed. This can prevent the AP mode from stopping when printing is being executed based on a print job received from another communication apparatus that has joined the network formed in the AP mode and allows the network to be canceled after a printing request from the other communication apparatus has ended normally.

Note that when the STA-AP 101 stops the AP mode, it may notify the user that the operation in the AP mode has been stopped. This allows, for example, the user of the STA-AP 101 to know that, instead of directly connecting the STA 104 to the STA-AP 101 in order to execute printing in the STA-AP 101, it is necessary to connect the STA 104 to the AP to which the STA-AP 101 is connected using the STA mode. Also, before stopping the AP mode in step S406, the STA-AP 101 can be set to accept a user selection about whether the AP mode can be stopped. For example, the STA-AP 101 can display a selection screen on the output unit 205 and advance the process to step S406 only when the user has permitted the AP mode to be stopped.

Subsequently, the STA-AP 101 connects to the AP (operating in the 5-GHz band) which was discovered in step S401 (step S407). If the STA-AP 101 is to further simultaneously operate in the AP mode while operating in the STA mode in the 5-GHz band, the STA-AP 101 will also have to operate by using the AP mode in the 5-GHz band. If the STA-AP 101 activates the wireless network 106 in the 5-GHz band using the AP mode, other communication apparatuses that operate in only the 2.4-GHz band cannot join the wireless network 106. As a result, even though the STA-AP 101 is executing the AP mode, a phenomenon in which a communication apparatus cannot join the wireless network formed by the AP mode can occur, and the user may become confused. In contrast, the STA-AP 101 according to this embodiment stops the operation in the AP mode if it is to operate in the STA mode in the 5-GHz band. As a result, the STA-AP 101 can suppress the simultaneous operation in the AP mode in the 5-GHz band when it operates in the STA mode in the 5-GHz band, and the aforementioned user confusion can be prevented by notifying the user about the operation state as needed.

In addition, the AP 102 having only the AP function often has RF control functions for both the 2.4-GHz band and the 5-GHz band. Hence, there may be a case in which the AP 102 can form a separate network (not shown) in the 2.4-GHz band while forming the wireless network 105 containing the STA-AP 101 in the 5-GHz band. In this case, the STA 104 having a 2.4-GHz band wireless LAN function may communicate with the STA-AP 101 via the AP 102. Therefore, instead of executing the AP mode in the 5-GHz band, the STA-AP 101 can stop the AP mode and notify the user of this stop. This allows the user to perform an operation to connect the STA 104 to the STA-AP 101 via the AP 102.

Returning the description to step S403, when the STA-AP 101 determines that the self-apparatus is not executing the AP mode (NO in step S403), it connects immediately to the AP discovered in step S401 (step S407). This is because wireless channel constraints need not be considered unless it is under an environment in which the STA mode and the AP mode can be executed concurrently. Also, in step S404, when the operation frequency of the discovered AP is not the 5-GHz band (NO in step S404), the STA-AP 101 determines whether the wireless channel of the discovered AP and the wireless channel used in the AP mode of the self-apparatus are different from each other (step S408). If these wireless channels are the same (NO in step S408), the STA-AP 101 connects to the discovered AP as is (step S407). On the other hand, if these wireless channels are different from each other (YES in step S408), the STA-AP 101 changes the wireless channel used in the AP mode of the self-apparatus to be the same wireless channel as that of the discovered AP and reactivates the AP mode (step S409). Subsequently, after the AP mode has been reactivated, the STA-AP 101 connects to the AP discovered in step S401 (step S407). This allows the STA-AP 101 which can execute the STA mode and the AP mode simultaneously in only one wireless channel to implement a simultaneous operation. Note that in step S409, as in step S405, if there is a print job before changing the wireless channel to be used in the AP mode, the STA-AP 101 may stand by until the printing ends. As a result, it can prevent the interruption of the printing operation. On the other hand, if the wireless channel is changed before the print job ends, the communication apparatus that has transmitted the print job can immediately attempt reconnection so that normal printing can be performed without interruption. Additionally, in this case, the STA-AP 101 can quickly connect to the AP discovered in step S401.

Figure 5:
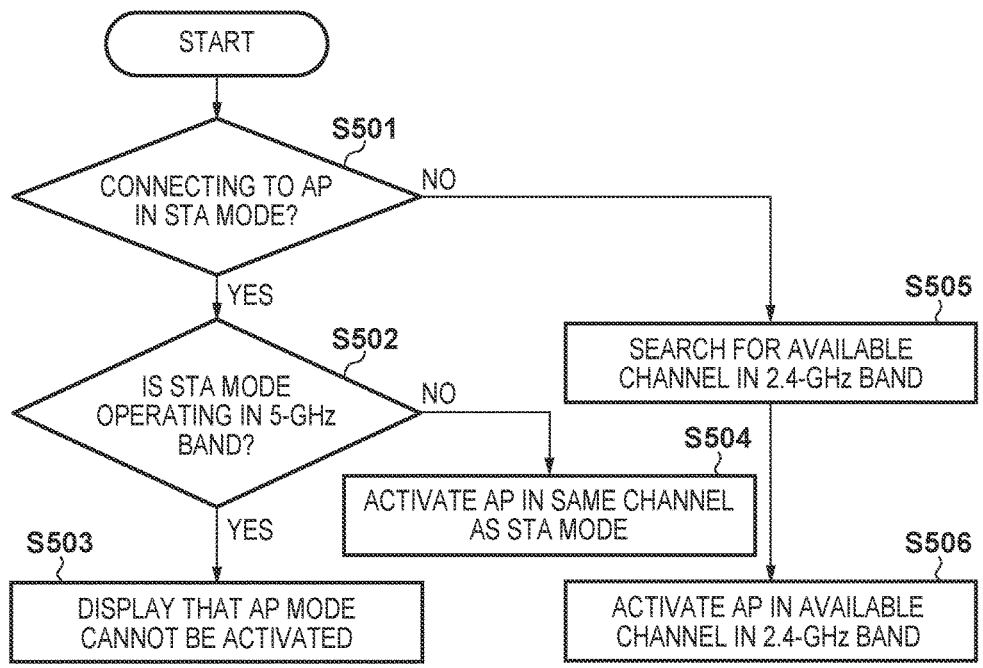
FIG. 5 is a flowchart showing an example of the procedure of AP mode activation processing.

The procedure of processing when the STA-AP 101 activates the AP mode will be described next with reference to FIG. 5. This processing is executed when response to the user of the STA-AP 101 completes the settings to cause the STA-AP 101 to form a network by wireless LAN. The settings for the STA-AP 101 to form the network by wireless LAN include settings such as an SSID for identifying the network, a security method, and a pass phrase. Also, after the user has executed the settings once, the STA-AP 101 executes this processing in response to the turning on of the power supply. In addition, the STA-AP 101 can execute this processing again if the connection destination AP in the STA mode has changed or has left the wireless network when the AP mode is stopped once in accordance with the flowchart of FIG. 4. Note that the flowchart shown in FIG. 5 can be implemented by the control unit 202 of the STA-AP 101 executing corresponding control programs stored in the storage unit 201 and executing calculation and processing of information in addition to controlling each piece of hardware.

First, the STA-AP 101 determines whether the self-apparatus is currently connected to another AP in the STA mode (step S501). When the STA-AP 101 determines that the self-apparatus is connected to the AP in the STA mode (YES in step S501), it subsequently determines whether the used frequency band of this STA mode is the 5-GHz band (step S502). If the used frequency band of the STA mode is the 5-GHz band (YES in step S502), the STA-AP 101 notifies the user that the AP mode cannot be activated (step S503). At this time, if this processing has not been started by an explicit instruction from the user, the STA-AP 101 can notify the user of the fact that the AP mode cannot be activated by causing an icon or the like to be displayed on a display included as the output unit 205.

If the used frequency band in the STA mode is not the 5-GHz band but is the 2.4-GHz band (NO in step S502), the STA-AP 101 activates the AP mode in the same wireless channel as that used in the STA mode (step S504). This allows the STA-AP 101 which is capable of wireless communication in only one wireless channel to perform simultaneous wireless communications using the STA mode and the AP mode.

On the other hand, when the STA-AP 101 determines that the self-apparatus is not connected to the AP in the STA mode (NO in step S501), it searches for an available channel in the 2.4-GHz band (step S505) and activates the AP mode using the wireless channel determined to be available (step S506).

The procedure of processing executed in the wireless communication system according to this embodiment will be described next with reference to FIG. 6. First, the STA-AP 101 starts STA-mode-connection processing in response to its activation (S601). This processing is executed in accordance with the flowchart of FIG. 4. The STA-AP 101 transmits a probe request to search for the AP 102 in accordance with the wireless settings set in advance by the user (S602). At this time, assume that the AP 102 does not transmit a probe response due to a reason such as not being powered-on or being in a location away from the STA-AP 101 or the like, and that the STA-AP 101 cannot discover the AP 102 at this point.

Next, assume that the user has operated the input unit 204 and instructed the activation of the AP mode to the STA-AP 101 (S603). When the STA-AP 101 receives the instruction to activate the AP mode, it executes AP-mode-activation processing in accordance with FIG. 5 (S604). At this time, since the STA-AP 101 is not connected to the AP in the STA mode, it searches for an available wireless channel in the 2.4-GHz band (S605). Here, assume that, as the result of the search, the STA-AP 101 has determined that channel 1 is available. The STA-AP 101 can activate the AP mode in channel 1 in accordance with this determination result and form the wireless network 106 (S606).

Here, assume that the STA 104 has executed connection processing to request the STA-AP 101 to perform printing (S607). The connection processing is performed in accordance with the IEEE802.11 standard, and the connection is established after authentication, association, and key exchange are performed. When the STA 104 joins the wireless network 106, it requests the STA-AP 101 to perform printing (S608). Upon receiving the printing request, the STA-AP 101 continuously receives data for printing from the STA 104. Note that although the transmission/reception of data for printing at this time is not shown in FIG. 6, assume that this process continues until the completion of printing in S611 (to be described later).

Here, assume that the STA-AP 101 has transmitted a probe request during the printing request and has discovered the AP 102 by receiving a probe response from the AP 102 (S609 and S610). Also, assume that at this time, the wireless channel used by the AP 102 is channel 36 in the 5-GHz band. The STA-AP 101 has been set to connect to the AP 102 in the STA mode in response to the discovery of the AP 102. However, at this point, since the STA-AP 101 is printing in the AP mode, it does not perform the connection processing until the printing has been completed.

Subsequently, upon completing the printing in the AP mode, the STA-AP 101 transmits a printing completion notification to the STA 104 (S611). Then, after transmitting the printing completion notification, the STA-AP 101 executes disconnection processing to disconnect the connection with the STA 104 which has joined the wireless network 106 (S612). For example, the STA-AP 101 transmits a deauthentication message in accordance with the IEEE802.11 standard and disconnects the established connection. After the disconnection processing has been completed, the STA-AP 101 stops the operation in the AP mode (S613). After stopping the operation in the AP mode, the STA-AP 101 executes the connection processing to establish a connection with the AP 102 (S614). Subsequently, the STA-AP 101 can accept a printing request or the like from each communication apparatus (for example, the STA 103) that has joined the wireless network 105.

As described above, in simultaneous operation of the STA mode and the AP mode, the STA-AP 101 can perform control so as to use the same wireless channel in the 2.4-GHz band without using a wireless channel in the 5-GHz band. In addition, when uniquely operating in the STA mode, operation in the 5-GHz band is possible.

Note that, in the above description, in order to support a communication apparatus (for example, the STA 104) that operates only in the 2.4-GHz band by using the AP mode, the STA-AP 101 stops the AP mode when a target AP to be connected in the STA mode is operating in the 5-GHz band. However, there may be a case in which the STA-AP 101 has been communicating originally with the STA 104 in the 5-GHz band in the AP mode. In this case, the STA-AP 101 can determine, in step S404, whether the discovered AP is operating in the 2.4-GHz band. That is, when the frequency band used in the currently operating AP mode and the frequency band used in the connection target AP in the STA mode are different from each other, the STA-AP 101 may stop the AP mode. Note that the frequency band described here indicates a single frequency band, such as the 2.4-GHz band and the 5-GHz band, including a plurality of wireless channels, and wireless channels indicate one or more partial bands included in the respective frequency bands. That is, the STA-AP 101 determines, in step S404, whether the used frequency bands match each other, and if they match (NO in step S404), the STA-AP 101 determines whether the wireless channels used in the frequency band match each other (step S408). Additionally, if the STA 104 connected using the AP mode supports the frequency band used by the discovered AP, the STA-AP 101 need not stop the AP mode. Hence, the STA-AP 101 may perform communication to confirm the frequency band supported by the STA 104 connected in the AP mode.

In the case of a state in which the 5-GHz band is to be used to operate in the AP mode, such as when the STA 104 can use only the 5-GHz band, the STA-AP 101 cannot activate the AP mode if the frequency band used in the STA mode is the 2.4-GHz band. Hence, in this case, the STA-AP 101 can determine that, in step S502, the AP mode cannot be activated when the used frequency band in the STA mode is the 2.4-GHz band. In addition, in this case, the STA-AP 101 can search for an available channel in the 5-GHz band in step S505.

Second Embodiment

In the first embodiment, concurrent execution of the STA mode and the AP mode in the 5-GHz band was restricted. However, in the second embodiment, concurrent execution of an STA mode and an AP mode using a wireless channel of W53/W56 requiring radar detection is restricted. When an STA-AP 101 is to activate the AP mode using a wireless channel of W53/W56, it needs to execute radar detection processing for a predetermined period before the activation in order to confirm that this channel will not interfere with the weather radar or the like, and thus no wireless communication can be performed during this period. Also, even if the STA-AP 101 has formed a wireless network 106 without detecting radar waves in the predetermined period, it subsequently requires continuous execution of the radar detection processing. If radar waves have been detected, the STA-AP 101 needs to stop wireless communication in this wireless channel for a predetermined period and switch to another wireless channel. Furthermore, since the STA-AP 101 may need to perform radar detection again at the time of this switching operation, it may prolong the period in which communication cannot be performed and degrade user convenience. For example, even when performing printing in the STA mode, the STA-AP 101 may need to switch to another wireless channel due to the detection of radar waves in the AP mode and may further need to execute the radar detection processing for a predetermined period in the switching destination wireless channel. In this case, since it will interrupt the reception of a job in the middle of a printing operation in the STA mode, the STA-AP 101 may not be able to complete the printing operation normally.

In this embodiment, in step S404 of FIG. 4, the STA-AP 101 does not determine whether the frequency band used in the discovered AP is the 5-GHz band, but determines whether the wireless channel used in the discovered AP is included in W53/W56. In addition, in step S502 of FIG. 5, the STA-AP 101 does not determine whether the frequency band used in the STA mode is the 5-GHz band, but confirms whether the used wireless channel is included in W53/W56. If the wireless channel used in the STA mode is included in W53/W56, the STA-AP 101 determines that the AP mode cannot be activated. In addition, if the wireless channel used in the STA mode is not included in W53/W56, the STA-AP 101 activates the AP mode in the same wireless channel as that used in the STA mode.

Furthermore, in steps S505 and S506, the STA-AP 101 can increase the possibility of connecting to various kinds of communication apparatuses by activating the AP mode in an available wireless channel in the 2.4-GHz band. That is, if the STA mode has not been activated, the STA-AP 101 activates the AP mode in the 2.4-GHz band instead of activating the AP mode in the 5-GHz band. As a result, a greater number of communication apparatuses can connect to the STA-AP 101 in the AP mode.

Third Embodiment

There exist a communication apparatus that can concurrently join, despite being capable of performing communication in only one channel at once due to hardware constraints, a plurality of wireless networks using wireless channels different from each other by dynamically switching the used channel by time division. Such a communication apparatus can join, even when the communication apparatus has already joined the wireless network of channel 1 in the STA mode, a wireless network using a channel different from channel 1 such as channel 6 or the like in the AP mode. At this time, the communication apparatus can notify, by entering a power save state defined by the IEEE802.11 standard, an AP of the wireless network to which the communication apparatus has joined in the STA mode of the fact that a packet cannot be received in timings except timings before and after a beacon has been transmitted. Accordingly, the communication apparatus operates in the wireless channel of the AP mode in timings except the timing before or after the beacon has been transmitted. Next, the communication apparatus suppresses other communication apparatuses from transmitting packets by transmitting, at a timing in which a beacon is to be transmitted in the wireless network to which the apparatus has joined in the STA mode, RTS/CTS in the wireless channel of the wireless network to which the apparatus has joined in the AP mode. Subsequently, the communication apparatus can switch, at a timing in which the beacon is transmitted in the wireless network to which the apparatus has joined in the STA mode, to the wireless channel of the wireless network and communicate with each communication apparatus in the wireless network.

In this embodiment, assume that an STA-AP 101 can perform time-divisional (pseudo) concurrent communication in a plurality of wireless channels by dynamically switching the plurality of wireless channels in this manner. When the STA-AP 101 executes the STA mode and the AP mode concurrently, it can cause the AP mode to operate in the 2.4-GHz band if the frequency band used by an AP discovered at the activation of the STA mode is the 5-GHz band.

Points different from the first embodiment will be described below in this embodiment. Note that the flowcharts shown in FIGS. 7 to 9 (to be described later) can be implemented by a control unit 202 of the STA-AP 101 executing control programs stored in a storage unit 201 and executing calculation and processing of information in addition to controlling each piece of hardware.

Figure 7:
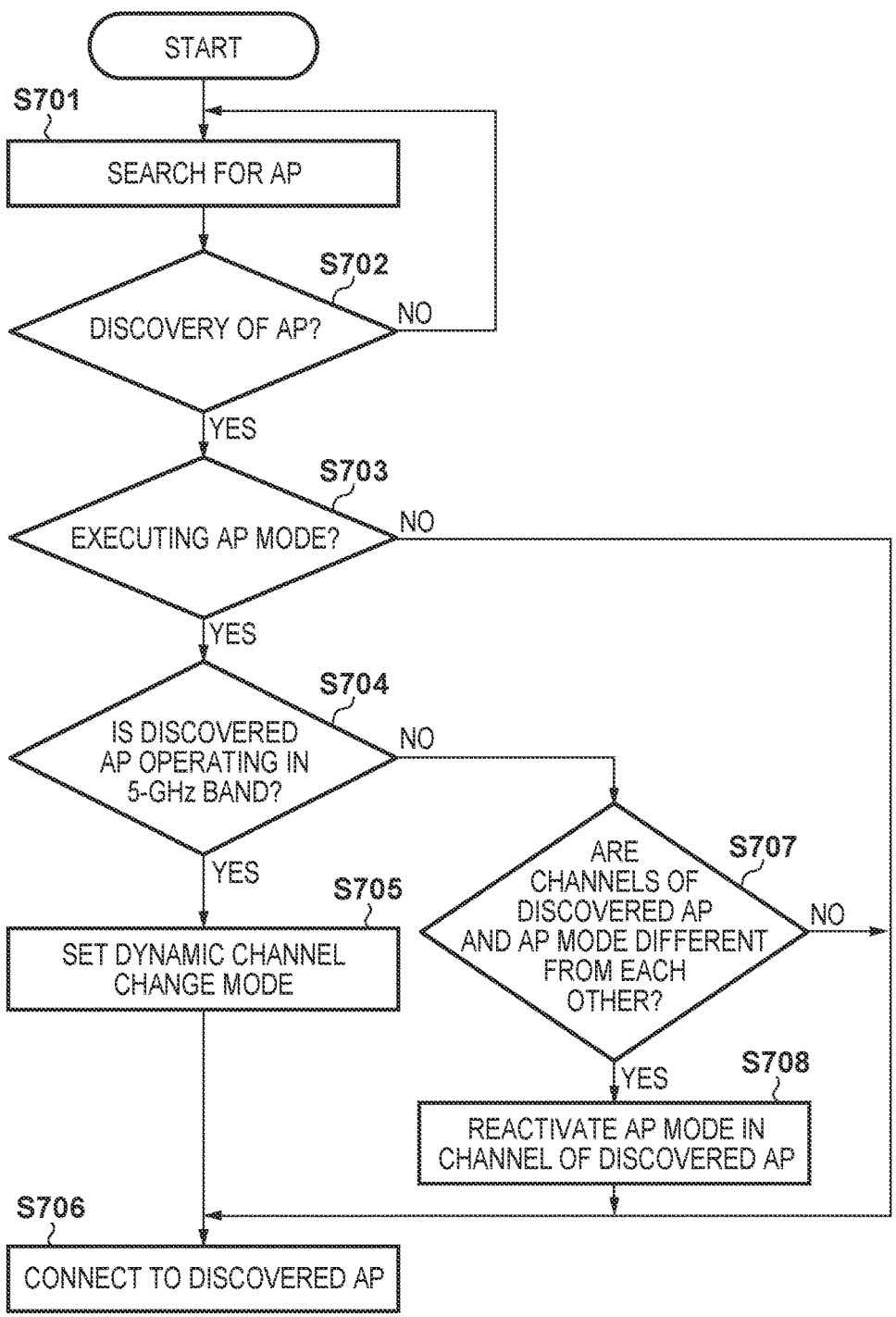
FIG. 7 is a flowchart showing an example of the procedure of STA mode connection processing.

FIG. 7 shows an example of the procedure of processing when the STA-AP 101 joins a wireless network 105 in the STA mode. Steps S701 to S704, step S707, and step S708 are the same as steps S401 to S404, step S408, and step S409 of FIG. 4, and a description thereof will be omitted. When the frequency band used in the discovered AP is the 5-GHz band, the STA-AP 101 sets the operation mode of the self-apparatus to a dynamic channel change mode (step S705) to connect to the discovered AP while using the 2.4-GHz band in the AP mode. In the dynamic channel change mode, the STA-AP 101 can dynamically change the wireless channel to be used. After setting the dynamic channel change mode, the STA-AP 101 connects to the AP discovered in step S702 in the 5-GHz band (step S706).

Figure 8:
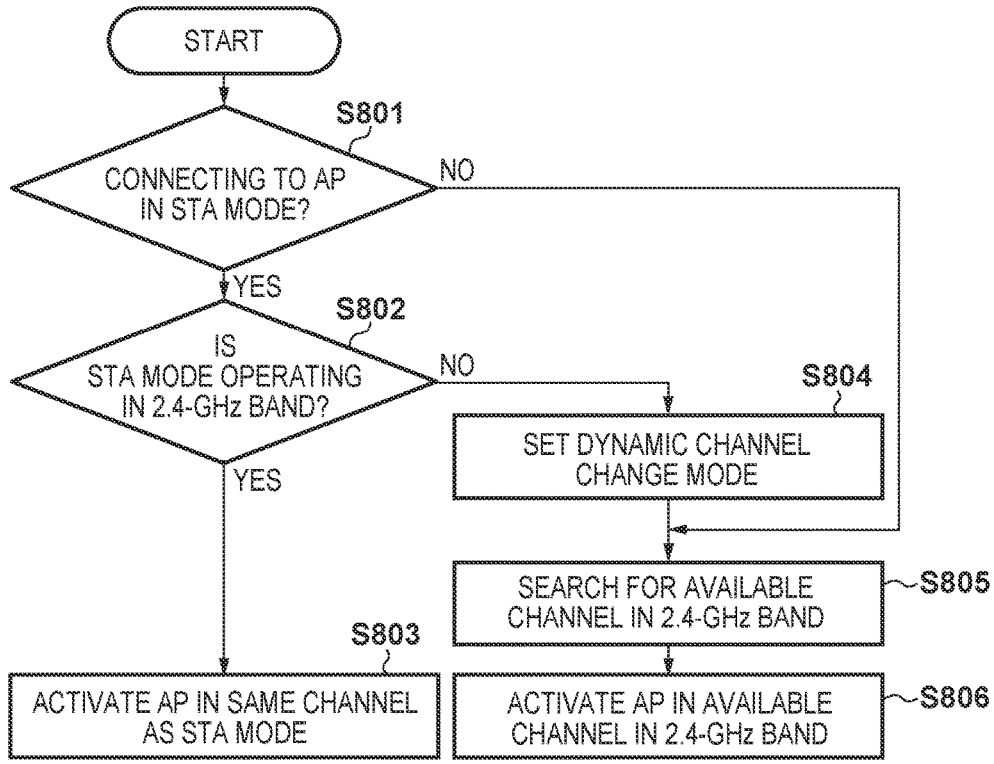
FIG. 8 is a flowchart showing an example of the procedure of AP mode activation processing.

FIG. 8 shows the procedure of processing when the STA-AP 101 activates the AP mode. Steps S801, S805, and S806 are the same as steps S501, S505, and S506 of FIG. 5, and a description thereof will be omitted. In step S801, when the STA-AP 101 determines that the self-apparatus is connected to an AP in the STA mode, it determines whether the frequency band used in the STA mode is the 2.4-GHz band (step S802). If the STA-AP 101 determines that the frequency band used in the STA mode is the 2.4-GHz band (YES in step S802), it activates the AP mode in the same wireless channel as that used in the STA mode (step S803). On the other hand, if the STA-AP 101 determines that the frequency band used in the STA mode is the 5-GHz band (NO in step S802), it changes the operation mode of the self-apparatus to the dynamic channel change mode (step S804). Subsequently, in steps S805 and S806, the STA-AP 101 searches for an available wireless channel in the 2.4-GHz band and activates the AP mode in the available channel.

As described above, even if the used frequency band in the STA mode is the 5-GHz band, the STA-AP 101 can increase the connection capability to other communication apparatuses by causing the AP mode to operate in the 2.4-GHz band supported by a greater number of communication apparatuses. In addition, in a case in which the used frequency band in the STA mode is the 2.4-GHz band, the STA-AP 101 can cause the AP mode to operate in the same wireless channel as that used in the STA mode. Since this obviates the need for the wireless channels to be dynamically switched by time division, the wireless communication can be stabilized.

Figure 9:
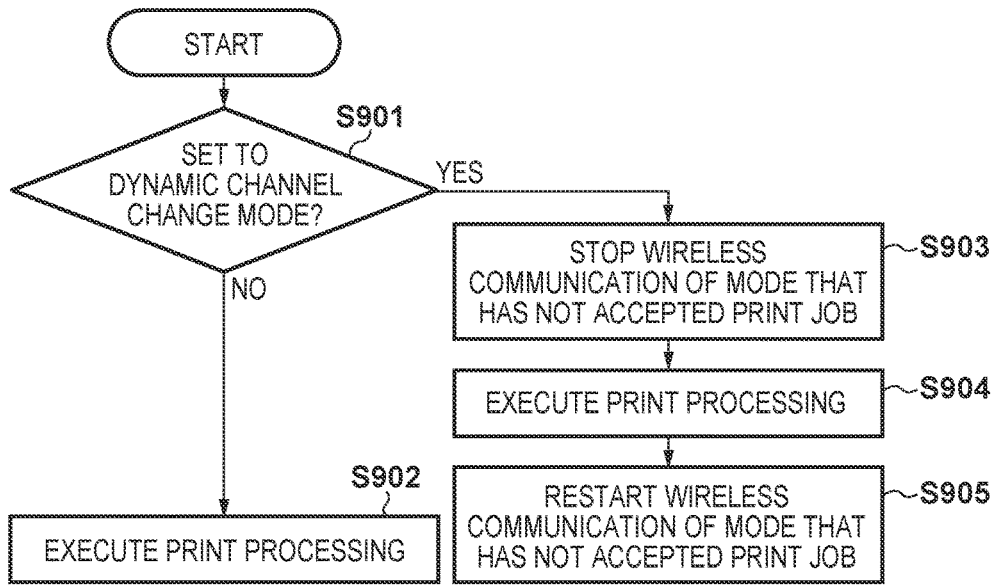
FIG. 9 is a flowchart showing an example of the procedure of print processing.

The procedure of print processing will be described next with reference to FIG. 9. This processing is executed when the STA-AP 101 receives a print job from another communication apparatus in the AP mode or the STA mode. Upon receiving the print job, the STA-AP 101 first determines whether its operation mode is set to the dynamic channel change mode (step S901). If the STA-AP 101 determines that its operation mode is not set to the dynamic channel change mode (NO in step S901), it starts the print processing based on the received print job (step S902). On the other hand, if the STA-AP 101 determines that its operation mode is set to the dynamic channel change mode (YES in step S901), it temporarily stops the wireless communication in the mode in which the self-apparatus has not received the print job (step S903) so that stable printing can be executed. For example, if the STA-AP 101 has received a print job from a communication apparatus which has joined the wireless network 105, the STA-AP 101 temporarily stops the AP mode. That is, the STA-AP 101 stops the communication in a wireless network 106. On the other hand, if the STA-AP 101 has received a print job from a communication apparatus which has joined the wireless network 106, the STA-AP 101 temporarily stops the STA mode and leaves the wireless network 105. When the STA-AP 101 has stopped the wireless communication in the wireless network from which the self-apparatus has not received the print job, the STA-AP 101 executes the print processing transmitted from a communication apparatus which has joined the wireless network from which the print job has been received (step S904). Subsequently, when the printing has been completed, the STA-AP 101 restarts the wireless communication in the mode that was stopped in step S903 (step S905). That is, if the AP mode was stopped in step S903, the STA-AP 101 forms the wireless network 106 again, and if the STA mode was stopped in step S903, STA-AP 101 rejoins the wireless network 105.

Figure 10:
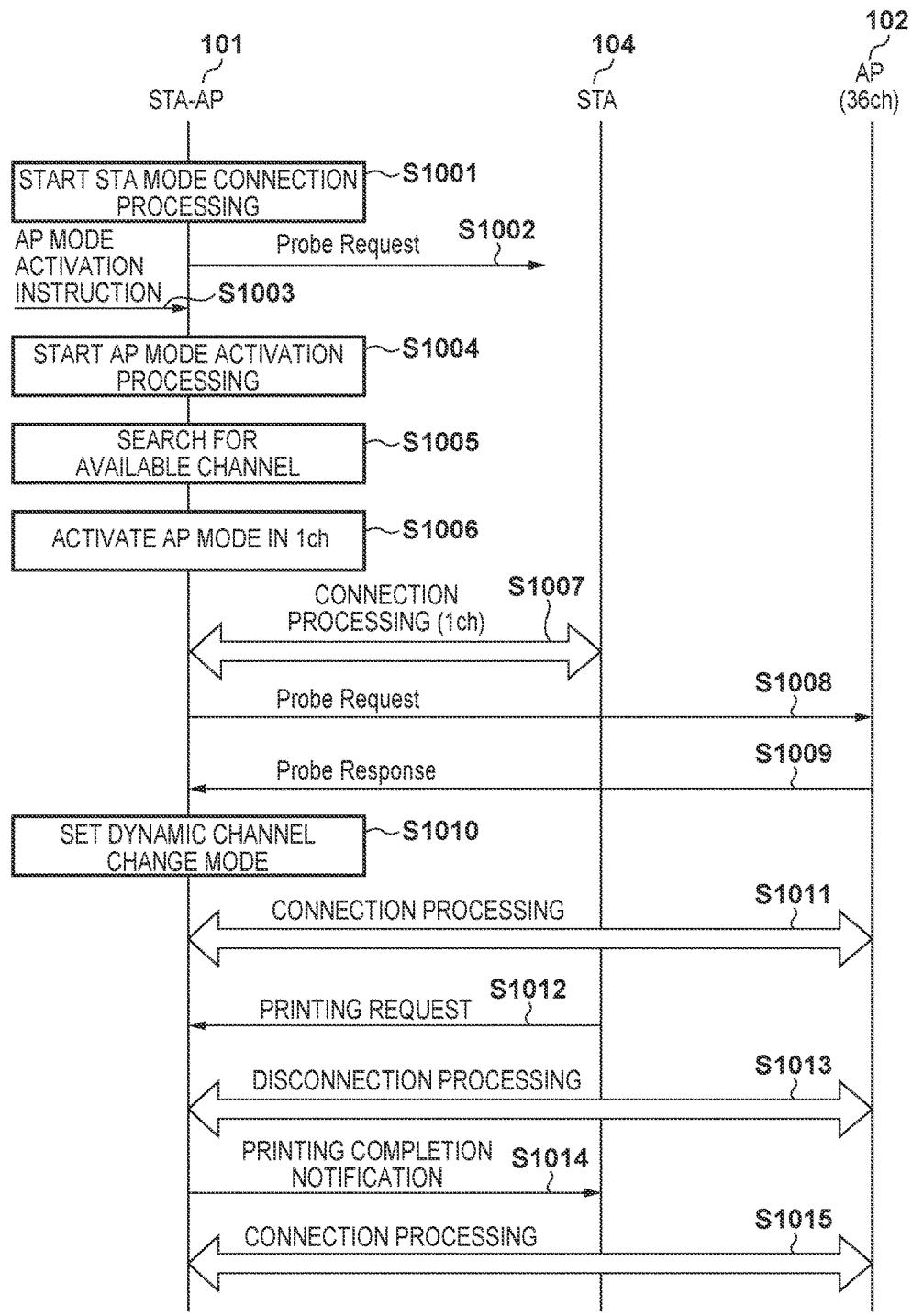
FIG. 10 is a sequence chart showing an example of a processing procedure in a wireless communication system.

The procedures of respective processes in the wireless communication system according to this embodiment will be described next with reference to FIGS. 10 and 11. FIG. 10 shows an example of the processing procedure when an AP 102 is using the 5-GHz band to operate, and FIG. 11 shows an example of the processing procedure when the AP 102 is using the 2.4-GHz band to operate.

Figure 6:
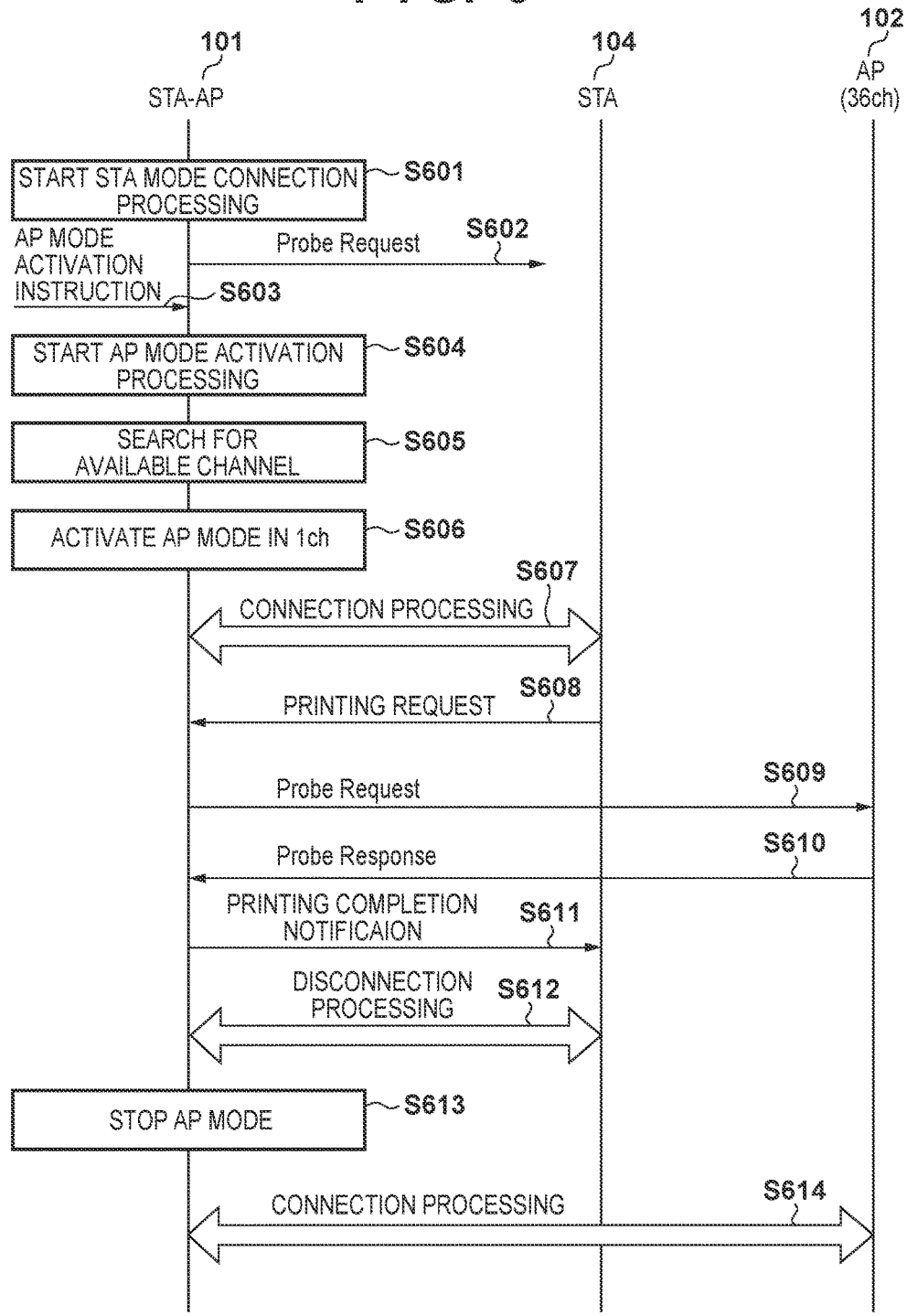
FIG. 6 is a sequence chart showing an example of a processing procedure in a wireless communication system.

S1001 to S1007 of FIG. 10 are the same as S601 to S607 of FIG. 6, and a description thereof will be omitted. Assume that the STA-AP 101 has discovered the AP 102 after S1007 (S1008 and S1009). In this case, the STA-AP 101 has activated the AP mode in accordance with FIG. 7 and sets its operation mode to the dynamic channel change mode (S1010) since the discovered AP is using the 5-GHz band to operate. The STA-AP 101 then connects to the AP 102 and joins the wireless network 105 (S1011). Here, assume that the STA-AP 101 receives a printing request from an STA 104 which has joined the wireless network 106 (S1012). Then, in accordance with FIG. 9, since its operation mode is the dynamic channel change mode, the STA-AP 101 temporarily leaves the wireless network 105 from which it has not received the printing request (S1013). Subsequently, when the printing has been completed, the STA-AP 101 transmits a printing completion notification to the STA 104 (S1014) and rejoins the wireless network 105 (S1015).

FIG. 11 will be described next. In FIG. 11, S1101 to S1109 are the same as S1001 to S1009 of FIG. 10, and a description thereof will be omitted. The STA-AP 101 has activated the AP mode and reactivates the AP mode using channel 6 in accordance with FIG. 7 since the AP 102 is using channel 6 of the 2.4-GHz band (S1110). In addition to connecting to the AP 102 by using channel 6 (S1111), the STA-AP 101 further reconnects to the STA 104 in the wireless network 106 which has switched the used wireless channel to channel 6 (S1112). Next, when the STA-AP 101 receives a printing request from the STA 104 (S1113), the STA-AP 101 executes printing without stopping the STA mode, in accordance with FIG. 9, since its operation mode is not the dynamic channel change mode in this case. Subsequently, when the print processing has been completed, the STA-AP 101 transmits the printing completion notification to the STA 104 (S1114). In the same manner, even when the STA-AP 101 receives a printing request (S1115) from an STA 103 (for example, via the AP 102), the STA-AP 101 executes printing without stopping the AP mode, in accordance with FIG. 9, and transmits a printing completion notification to the STA 103 after completing the printing (S1115).

As described above, in this embodiment, if the used frequency band in the STA mode is the 2.4-GHz band, the STA-AP 101 uses the same wireless channel for the AP mode to stabilize the communication and sets a state in which many communication apparatuses can be connected. On the other hand, even if the used frequency band in the STA mode is the 5-GHz band, the STA-AP 101 can set a state in which many communication apparatuses can be connected by operating the AP mode in the 2.4-GHz band. In addition, if the STA mode and the AP mode are to operate in different channels, the STA-AP 101 can stabilize the communication by enabling, when application communication has been started, the wireless communication of the mode which is used in that communication and stopping the other wireless communication.

Fourth Embodiment

Although the simultaneous operation of the STA mode and the AP mode in the 5-GHz band was restricted in the third embodiment, the simultaneous operation of the STA mode and the AP mode in a wireless channel of W53/W56 requiring radar detection is restricted in the fourth embodiment.

In this embodiment, an STA-AP 101 does not determine, in step S704 of FIG. 7, whether the used frequency band of a discovered AP is the 5-GHz band, but determines whether the wireless channel used by the discovered AP is included in W53/W56. Also, in step S802 of FIG. 8, the STA-AP 101 does not determine whether the used frequency band in the STA mode is the 5-GHz band, but confirms whether the used wireless channel is included in W53/W56. If the wireless channel used in the STA mode is included in W53/W56, the STA-AP 101 will operate in the AP mode by using a wireless channel not included in W53/W56. As a result, the processing load can be reduced since the STA-AP 101 need not execute the radar detection processing. The STA-AP 101 can prevent the occurrence of an event in which a connection is disconnected in response to the detection of the radar waves. Additionally, it is possible for the STA-AP 101 to simultaneously operate the STA mode and the AP mode without having a radar detection function. If a wireless channel included in W53/W56 is not used in the STA mode, the STA-AP 101 sets the wireless channel to be used in the AP mode to be the same as that of the STA mode. As a result, the STA-AP 101 capable of wireless communication using only one wireless channel at one point can simultaneously operate in the STA mode and the AP mode.

Furthermore, in steps S805 and S806, the STA-AP 101 can increase the possibility to connect with various kinds of communication apparatuses by activating the AP mode in an available wireless channel in the 2.4-GHz band. That is, when the STA mode has not been activated, the STA-AP 101 can activate the AP mode in the 2.4-GHz band instead of activating the AP mode in the 5-GHz band. As a result, a greater number of communication apparatuses can connect to the STA-AP 101 in the AP mode.

Other Embodiments

In the first and third embodiments, in a case in which the STA-AP 101 discovers an AP using the 2.4-GHz band and an AP using the 5-GHz band as connection destination AP candidates, the STA-AP 101 can preferentially select the AP using the 2.4-GHz band to serve as the connection destination. This obviates the need for the STA-AP 101 to stop the AP mode or set its operation mode to the dynamic channel change mode. As a result, the STA-AP 101 can prevent a situation in which the AP mode cannot be used, and thus user convenience can be improved. Also, in the case in which the STA-AP 101 discovers both the AP using the 2.4-GHz band and the AP using the 5-GHz band, the STA-AP 101 can preferentially select the AP using the 5-GHz to serve as the connection destination AP only when the AP using the 5-GHz band can perform communication at a higher speed. For example, consider a case in which a first AP using the 2.4-GHz band supports the IEEE802.11n communication standard and a second AP using the 5-GHz band is complying with the IEEE802.11ac communication standard. In this case, since the second AP can communicate at a higher speed, the STA-AP 101 can select the second AP to serve as the connection destination AP. On the other hand, consider a case in which it can be expected that the two APs will be capable of communicating in the same communication rate since the first AP using the 2.4-GHz band and the second AP using the 5-GHz band both support the IEEE802.11n communication standard. In this case, since both the first AP and the second AP can communicate only at approximately the same speed, the STA-AP 101 can select, to serve as the connection destination AP, the AP using the 2.4-GHz band which is capable of communicating without restrictions even when the AP mode is activated.

Although it has been described that the STA-AP 101 will continue the AP search processing in steps S401 and S701, since the connection processing may not be performed until the completion of the printing even if an AP is discovered when printing in the AP mode, this search processing can be stopped during printing. By stopping the AP search processing during printing, the STA-AP 101 can complete printing rapidly, and reduce the power consumption related to the search processing and the occupancy of the wireless band.

In the third embodiment, it was described that the 2.4-GHz band is always used by the STA-AP 101 to activate the AP mode. However, in a case in which it is known in advance that a communication apparatus which is to join a wireless network 106 can use the 5-GHz band, the STA-AP 101 can activate the AP mode in the 5-GHz band when the used frequency band in the STA mode is the 5-GHz band. For example, a setting item allowing the 5-GHz band to be set as the used frequency band in the AP mode can be prepared on the UI of the STA-AP 101 so that the user can arbitrarily select the 5-GHz band. However, even in this case, the AP mode can be set to always use the 2.4-GHz band as the default setting of the STA-AP 101 to accommodate users who do not have a lot of knowledge about wireless communication.

In addition, the STA-AP 101 may activate the AP mode via a Group Owner Negotiation (to be referred to as "Go Nego" hereinafter) of Wi-Fi Direct. In this case, the STA-AP 101 can know, before the activating the AP mode, the wireless channel that can be used by each wireless communication apparatus joining the wireless network 106. Note that the AP mode here corresponds to the role determined as a group owner in the Wi-Fi Direct standard, and the communication apparatus which is to serve as the STA joining the wireless network 106 corresponds to a client in the Wi-Fi Direct standard. In this case, the STA-AP 101 can use a specific wireless channel of the 5-GHz band in the STA mode and activate the AP mode in the 5-GHz band when this 5-GHz band wireless channel is supported by the client. As a result, the STA-AP 101 need not dynamically switch the wireless channel and can communicate with a partner apparatus requiring communication in the AP mode. However, even when the AP mode is activated via the GO Nego, a case in which the STA-AP 101 communicates with a communication apparatus other than that which has executed the GO Nego in the wireless network 106 formed in the AP mode can be considered. In this case, the STA-AP 101 can activate the AP mode in the 2.4-GHz band. Also, whether the STA-AP 101 can communicate with a communication apparatus other than that which has executed the GO Nego can be set by accepting an operation made in advance by the user of the STA-AP 101. For example, it can be arranged so that the STA-AP 101 has a mode of occupying the direct communication performed by the self-apparatus and a mode allowing communication to be performed from a plurality of communication apparatus by a direct mode, and the user can switch the modes from the UI of the STA-AP 101.

Also, in order to know, in advance, the wireless channel that can be used by each communication apparatus joining the wireless network 106, the STA-AP 101 can use another method such as Invitation of the Wi-Fi Direct standard.

Note that although descriptions using the examples of the 2.4-GHz band and the 5-GHz band were given in the respective above-described embodiments, the present invention is not limited to these frequency bands. In a case in which there are more use constraints in the other frequency band than in one frequency band, each of the above-described embodiments can be applied to an apparatus capable of wireless communication in parallel to these frequency bands.

In addition, in the second and fourth embodiments, concurrent execution of the STA mode and the AP mode was restricted in a case in which the wireless channel used in the STA mode is a wireless channel requiring radar detection such as a wireless channel included in W53/W56. However, the present invention is not limited to this. That is, even if it is a wireless channel not included in W53/W56, the same restrictions can be imposed as long as it is a wireless channel required to have a predetermined function as a condition when the wireless channel used in the STA mode is to be used in the AP mode.

According to the present invention, in a communication apparatus that can execute a plurality of communication modes concurrently, the loss of user convenience can be prevented by the restriction of usable communication channels.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150553, filed Jul. 29, 2016, which is hereby incorporated by reference herein in its entirety.

What is claimed is:

1. A communication apparatus that providing a first mode of joining a wireless network formed by another apparatus and a second mode of forming a wireless network, the first and second modes being executable concurrently, the communication apparatus comprising:
at least one memory storing instructions; and
at least one processor configured to implement the instructions and execute a plurality of tasks, including, while the communication apparatus is concurrently executing the first and second modes:
a determination task that determines whether a first wireless channel used in the first mode is a specific wireless channel requiring the communication apparatus to include a predetermined function to avoid radio-wave interference when operating the communication apparatus in the second mode using the first wireless channel; and
a control task that:
in a case where the determination task determines that the first wireless channel is the specific wireless channel, controls the communication apparatus to not operate the second mode using the first wireless channel; and
in a case where the determination task determines that the first wireless channel is not the specific wireless channel, controls the communication apparatus to operate the second mode using the first wireless channel.

2. The apparatus according to claim 1, wherein the specific wireless channel is a wireless channel in a 5-GHz band.

3. The apparatus according to claim 1, wherein the specific wireless channel is a wireless channel that requires the communication apparatus to include the predetermined function as a condition of use in the second mode.

4. The apparatus according to claim 3, wherein the predetermined function is a function of detecting radar waves.

5. The apparatus according to claim 1, wherein the first mode is a Station mode complying with the IEEE802.11 standard and the second mode is an Access Point mode complying with the IEEE802.11 standard.

6. The apparatus according to claim 1, further comprising one wireless chip that performs wireless communication in the first mode and wireless communication in the second mode.

7. A control method for a communication apparatus that a first mode of joining a wireless network formed by another apparatus and a second mode of forming a wireless network, the first and second modes being executable concurrently, the method comprising the steps of, while the communication apparatus is concurrently executing the first and second modes:
determining whether a first wireless channel used in the first mode is a specific wireless channel requiring the communication apparatus to include a predetermined function to avoid radio-wave interference when operating the communication apparatus in the second mode using the first wireless channel;
controlling, in a case where the determining step determines that the first wireless channel is the specific wireless channel, the communication apparatus to not operate the second mode using the first wireless channel; and
controlling, in a case where the determining step determines that the first wireless channel is not the specific wireless channel, the communication apparatus to operate the second mode using the first wireless channel.

8. A non-transitory computer readable storage medium for storing a program executable by a computer included in a communication apparatus that provide a first mode of joining a wireless network formed by another apparatus and a second mode of forming a wireless network, the first and second mode being executable concurrently, to execute a method comprising the steps of, while the communication apparatus is concurrently executing the first and second modes:
- determining whether a first wireless channel used in the first mode is a specific wireless channel requiring the communication apparatus to include a predetermined function to avoid radio-wave interference when operating the communication apparatus in the second mode using the first wireless channel;
- controlling, in a case where the determining step determines that the first wireless channel is the specific wireless channel, the communication apparatus to not operate the second mode using the first wireless channel; and
- controlling, in a case where the determining step determines that the first wireless channel is not the specific wireless channel, the communication apparatus to operate second mode using the first wireless channel.

* * * * *